United States Patent [19]

Ura et al.

[11] Patent Number: 5,114,758
[45] Date of Patent: May 19, 1992

[54] PROCESS FOR PRODUCING RESIN FOR PAPER COATING

[75] Inventors: Shigeru Ura, Nara; Haruo Tanaka, Osaka; Hisao Takagishi, Kyoto; Hiroko Fukuyama, Osaka; Takuya Fukuyama, Osaka; Yuko Fukuyama, Osaka, all of Japan

[73] Assignee: Sumitomo Chemical Co., Ltd., Osaka, Japan

[21] Appl. No.: 700,944

[22] Filed: Mar. 13, 1991

Related U.S. Application Data

[60] Division of Ser. No. 586,399, Sep. 18, 1990, which is a continuation of Ser. No. 924,010, Oct. 28, 1986, abandoned.

[30] Foreign Application Priority Data

| Oct. 28, 1985 | [JP] | Japan | 60-242529 |
| Oct. 29, 1985 | [JP] | Japan | 60-242400 |
| Nov. 15, 1985 | [JP] | Japan | 60-257437 |
| Nov. 21, 1985 | [JP] | Japan | 262284 |
| Nov. 21, 1985 | [JP] | Japan | 60-262285 |
| Nov. 21, 1985 | [JP] | Japan | 60-262286 |

[51] Int. Cl.$^5$ .............................................. B32B 9/00
[52] U.S. Cl. .................................... 427/391; 427/411; 524/608; 525/427
[58] Field of Search ............... 427/391, 411; 524/608; 525/427

[56] References Cited

U.S. PATENT DOCUMENTS

| 2,130,948 | 4/1937 | Carothers | 528/263 |
| 2,244,184 | 9/1938 | Austin et al. | 528/263 |
| 2,334,545 | 8/1939 | D'Alelio | 528/263 |
| 2,371,997 | 10/1942 | Hoover et al. | 528/263 |

FOREIGN PATENT DOCUMENTS 167315 10/1982 Japan.
111328 5/1986 Japan.

*Primary Examiner*—Morton Foelak
*Attorney, Agent, or Firm*—Sughrue, Mion, Zinn, Macpeak & Seas

[57] ABSTRACT

A process for producing a resin is disclosed, comprising reacting (a) a polyalkylenepolyamine, (b) an alicyclic dibasic carboxylic acid and/or a reaction product having a free carboxyl group that is obtained by reacting an alicyclic dibasic carboxylic acid with a glycol, (c) a urea, and (d) an aldehyde and/or an alkylating agent. The resulting resin is useful as a wet strength agent to provide a paper coating composition having improved printability and printing effects.

5 Claims, No Drawings

PROCESS FOR PRODUCING RESIN FOR PAPER COATING

This is a division of application Ser. No. 07/586,399, filed Sep. 18, 1990, which is a continuation of application Ser. No. 06/924,010, filed Oct. 28, 1986, now abandoned.

FIELD OF THE INVENTION

This invention relates to a process for producing a novel resin useful for paper coating, and the like, and to a paper coating composition containing the same, which provides coated paper having excellent printability and printing effects.

BACKGROUND OF THE INVENTION

Coated paper obtained by applying a paper coating composition mainly comprising a pigment and an aqueous binder on paper, followed by necessary steps, such as drying, calendering, etc., has conventionally been employed widely for commercial prints, magazines, books, and so on owing to its properties, such as excellent printing effects With an increasing demand for higher quality and a development of high-speed printing techniques, constant efforts have been made to improve the quality of coated paper. In particular, in the field of offset printing that is in a majority among various printing techniques, it is a weighty subject to improve ink receptivity and water resistance, e.g., wet pick or wet rub, under the influence of wetting water, and anti-blister property on a rotary press.

A conventional approach to the above-described subject is addition of wet strength agents and the like, such as a melamine-formaldehyde resin, a urea-formaldehyde resin, a polyamidepolyurea-formaldehyde resin, a polyamidepolyurea-formaldehyde-epihalohydrin resin, and those disclosed in Japanese Patent Publication Nos. 11667/69 and 32597/84, Japanese Patent Application (OPI) NO. 40322/83, etc. (the term "OPI" as used herein means "unexamined published application").

These wet strength agents and the like, though exhibiting the respective effects, are not satisfactory for practical use due to serious disadvantages. For example, aminoplast resins including melamine-formaldehyde resins, urea-formaldehyde resins, etc. not only cause considerable evolution of formaldehyde from coated paper during working but also virtually fail to achieve improvements in ink receptivity or anti-blister property. Moreover, the expected effect to improve water resistance becomes hard to obtain as a pH of a paper coating composition increases. Although the polyamidepolyureaformaldehyde resin is effective on improvement of water resistance as well as ink receptivity and anti-blister property, the degree of reached improvement is still insufficient for satisfying recent requirements for higher coated paper qualities. Therefore, there is much room for further improvement of performances.

SUMMARY OF THE INVENTION

An object of this invention is to provide a process for producing a novel resin, by which high water resistance, ink receptivity, and the like that cannot be achieved by the conventional techniques can be imparted to coated paper.

Another object of this invention is to provide a paper coating composition containing such a resin, which can produce coated paper having high water resistance, ink receptivity, and the like.

As a result of extensive investigations with the above objects, the inventors have now found a process for obtaining a resin that meets the above-described requirements and also proved that a paper coating composition comprising (1) a pigment, (2) an aqueous binder and (3) the above resin is extremely effective for accomplishing the above objects.

The present invention provides a process for producing a resin, which comprises reacting (a) a polyalkylenepolyamine, (b) an alicyclic dibasic carboxylic acid and/or a reaction product having a free carboxyl group that is obtained by the reaction between an alicyclic dibasic carboxylic acid and a glycol, (c) a urea, and (d) an aldehyde and/or an alkylating agent.

The present invention further relates to a paper coating composition comprising (1) a pigment, (2) an aqueous binder, and (3) the resin obtained by the above-described process.

A chief feature of this invention consists in the use of the component (b), i.e., an alicyclic dibasic carboxylic acid and/or a reaction product having a free carboxyl group obtained by the reaction between an alicyclic dibasic carboxylic acid and a glycol. The resin obtained by the present invention has marked improvements in performances over the conventionally employed paper coating resins obtained from aliphatic or aromatic dibasic carboxylic acids.

DETAILED DESCRIPTION OF THE INVENTION

The polyalkylenepolyamines (a) which can be used in the invention are compounds containing two primary amino groups and at least one secondary amino group per molecule. Specific examples of such compounds include diethylenetriamine, triethylenetetramine, tetraethylenepentamine, iminobispropylamine, 3-azahexane-1,6-diamine, 4,7-diazadecane-1,10-diamine, etc. These polyalkylenepolyamines can be used either individually or as mixtures of two or more thereof. It is possible to use aliphatic diamines, e.g., ethylenediamine, propylene-diamine, dimethylaminopropylamine, etc., heterocyclic polyamines, e.g., bisaminomethylpiperazine, aminoethylpiperazine, etc., and the like in combination with the above-described polyalkylenepolyamines as far as such a combined use does not deviate from the purpose of this invention.

The alicylic dibasic carboxylic acids (b) are compounds having two carboxyl groups per molecule inclusive of esters and anhydrides thereof. Typical examples of such alicylic dibasic carboxylic acids include carboxylic acids, e.g., tetrahydrophthalic acid, hexahydrophthalic acid, cyclohexane-1,4-dicarboxylic acid, 4-methyltetrahydrophthalic acid, etc., and esters thereof; acid anhydrides, e.g., tetrahydrophthalic anhydride, hexahydrophthalic anhydride, 4-methyltetrahydrophthalic anhydride, 4-methylhexahydrophthalic anhydride, $\Delta^4$-tetrahydrophthalic anhydride, 4-methyl $\Delta^4$-tetrahydrophthalic anhydride, etc.; and a 1:2 adduct of a styrene and maleic anhydride.

These carboxylic acids may be used either individually or in combination thereof. Unless hindering the effects of the invention, other dibasic carboxylic acids, such as aliphatic dicarboxylic acids (e.g., adipic acid, glutaric acid, etc.) or aromatic dicarboxylic acids (e.g., terephthalic acid, phthalic acid, etc.), may be used in combination with these alicyclic dibasic carboxylic acids.

Examples of the glycols which can be used in the present invention include alkylene glycols, e.g., ethylene glycol, propylene glycol, butanediol, etc., cycloalkylene glycols, e.g., cyclopentanediol, cyclohexanediol, etc., alkenylene glycols, e.g., butenediol, octenediol, etc., polyalkylene glycols, e.g., diethylene glycol, dipropylene glycol, triethylene glycol, polyethylene glycol, polytetramethylene glycol, etc., ethylene oxide adducts of bisphenol A, ethylene oxide adducts of hydrogenated bisphenol A, and the like.

The reaction product having a free carboxyl group which is obtained by reacting an alicyclic dibasic carboxylic acid and a glycol is a carboxyl-terminated polyester obtained by reacting the above-recited alicyclic dibasic carboxylic acid and the above-recited glycol at a molar ratio of excess carboxylic acid. This reaction is usually carried out in the presence or absence of a catalyst at a temperature of from 80° C. to 200° C. for a period of from 30 minutes to 2 hours.

The ureas (c) specifically include urea, thiourea, guanylurea, methylurea, dimethylurea, etc., with urea being preferred from an industrial viewpoint.

The aldehydes (d) include monoaldehydes, e.g., formaldehyde, acetaldehyde, propionaldehyde, acrolein, glyoxylic acid, glycolaldehyde, etc., and polyaldehydes, e.g., glyoxal, glutaraldehyde, etc. Of these, the preferred monoaldehyde is formaldehyde, and the preferred polyaldehyde is glyoxal.

The alkylating agent to be used as component (d) includes the following compounds (i) to (vi):

(i) Halogen-containing compounds represented by formula $$R_1-X$$

wherein $R_1$ represents a lower alkyl group, an alkenyl group, a benzyl group or a phenoxyethyl group; and X represents a halogen atom.

Preferred examples are methyl chloride, ethyl chloride, propyl chloride, allyl chloride, benzyl chloride, phenoxyethyl chloride, and corresponding bromides and iodides.

(ii) Dialkyl sulfites and dialkyl sulfates represented by formula:

$$(R_2O)_2SO_v$$

wherein $R_2$ represents a lower alkyl group; and v represents 1 or 2.

Preferred examples are dimethyl sulfate, diethyl sulfate, dimethyl sulfite, diethyl sulfite, etc.

(iii) Ethylene oxide derivatives represented by formula:

wherein $R_3$ represents a hydrogen atom, a lower alkyl group, a hydroxyalkyl group or a phenyl group.

Preferred examples are ethylene oxide, propylene oxide, butylene oxide, styrene oxide, glycidol, etc.

(iv) Epihalohydrins represented by formula:

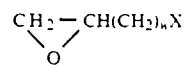

wherein X represents a halogen atom; and w represents 1, 2 or 3.

Preferred examples are epichlorohydrin, epibromohydrin, etc.

(v) Monohalohydrins represented by formula:

$$HOCH_2(CH_2)_wX$$

wherein X and w are as defined above.

Preferred examples are ethylene chlorohydrin, ethylene bromohydrin, etc.

(vi) Dihalohydrins represented by formula:

$$\begin{array}{l} CH_2-X \\ | \\ CH-Y \\ | \\ CH_2-Z \end{array}$$

wherein X is as defined above; and either one of Y and Z represents a halogen atom, with the another being a hydroxyl group.

Preferred examples are 1,3-dichloro-2-propanol, 2,3-dichloro-1-propanol, etc.

The preferred among these alkylating agents is epichlorohydrin. The above-described compounds may be used individually or in combinations of two or more thereof.

Not only either aldehydes or alkylating agents but the both may be used as component (d) on condition that the aldehyde to be used in combination with the alkylating agent is selected from formaldehyde, glyoxal and a mixture thereof.

The process for producing the resin according to the present invention will be described. The resin can be prepared by, for example, reacting a reaction product of components (a), (b) and (c) with component (d). The order for reacting components (a), (b) and (c) can be selected arbitrarily.

For example, components (a) and (b) are first reacted, and then the resulting product is reacted with component (c). The reaction between components (a) and (b) can be effected at a temperature of from 120° C. to 250° C., and preferably from 130° C. to 200° C., for a period of from 2 to 12 hours while driving produced water out of the system. From 0.4 to 4 equivalents, and preferably from 0.8 to 3 equivalents, of carboxyl groups in component (b) is reacted per mol of component (a), polyalkylenepolyamines. The subsequent reaction between the resulting dehydration condensation product and component (c), ureas, can be carried out at a temperature ranging from 100° C. to 180° C., and preferably from 110° C. to 160° C., for a period of from 1 to 6 hours while removing produced ammonia out of the system. The amount of component (c) to be used is not more than 1 equivalent, and preferably from 0.1 to 0.8 equivalent, per equivalent of the amino groups in component (a), i.e., primary and secondary amino groups.

Another procedure for reaction comprises first reacting components (a) and (c), then reacting the product with component (b), and further reacting the resulting product with component (c). The first reaction is conducted at a temperature of from 100° C. to 180° C., and preferably from 110° C. to 160° C., for a period of from 1 to 6 hours to remove ammonia. The amount of component (c) to be used is from 0.2 to 1 mol, and preferably from 0.3 to 0.8 mol, per mol of component (a). The resulting reaction product is then reacted with component (b) at a temperature of from 120° C. to 250° C., and preferably from 130° C. to 200° C., for a period of from 2 to 12 hours while removing produced water out of the system. The component (b) is used in an amount of from 0.2 to 2 equivalents, and preferably from 0.3 to 1.8 equivalents, per mol of component (a). The final reaction between the reaction product of components (a), (b) and (c) and component (c) can be performed at a temperature of from 100° C. to 180° C., and preferably from 110° C. to 160° C., for a period of from 1 to 6 hours. The amount of component (c) to be used here is not more than 2 equivalents, and preferably in a range of from 0.1 to 1.5 equivalent, per equivalent of secondary amino groups in component (a).

A still another procedure for reaction comprises simultaneously reacting components (a), (b) and (c), and then further reacting the resulting product with component (c). The first reaction of components (a), (b) and (c) can be achieved at a temperature of from 100° C. to 200° C., and preferably from 110° C. to 180° C., for a period of from 2 to 12 hours while removing produced ammonia and water out of the reaction system. A suitable ratio of components (a), (b) and (c) in this reaction step is from 0.2 to 2 equivalents, and preferably from 0.3 to 1.8 equivalents, of carboxyl groups in component (b) and from 0.2 to 1 mol, and preferably from 0.3 to 0.8 mol, of component (c), per mol of component (a). The resulting reaction product is then reacted with component (c) at a temperature of from 100° C. to 180° C., and preferably from 110° C. to 160° C., for a period of from 1 to 6 hours. The amount of component (c) to be suitably used in this reaction is not more than 2 equivalents, and preferably from 0.1 to 1.5 equivalents, per equivalent of secondary amino groups in component (a).

The reaction product of components (a), (b) and (c) as obtained by any of these reaction procedures is dissolved in water and then reacted with component (d), i.e., aldehydes and/or alkylating agents.

The reaction with aldehydes alone can be carried out in an aqueous solution at a concentration of from 20% to 70%, and preferably from 30% to 60%, by weight at a temperature of from 40° C. to 80° C. for a period of from 1 to 10 hours. The amount of the polyaldehydes or monoaldehydes to be used is from 0.05 to 1.0 mol, and preferably from 0.1 to 0.8 mol, or from 0.1 to 1.0 mol, and preferably from 0.2 to 0.7 mol, respectively, per mol of component (c). After completion of the reaction, the reaction mixture is adjusted, if necessary, to a pH of from 4 to 7 by addition of an alkali, e.g., sodium hydroxide, potassium hydroxide, etc., or an acid, e.g., hydrochloric acid, sulfuric acid, etc.

The reaction with alkylating agents can be conducted in an aqueous solution at a concentration of from 20% to 80%, and preferably from 30% to 70%, by weight, and a pH ranging from 3 to 12 at a reaction temperature of from 20° C. to 80° C. for a period of from 1 to 10 hours. A suitable amount of the alkylating agents to be used is not more than 2 equivalents, and preferably from 0.1 to 1.5 equivalents, per equivalent of secondary amino groups in component (a).

If in using both aldehydes an alkylating agents as component (d), the order of reacting the reaction product of components (a), (b) and (c) with these compounds is arbitrarily selected. That is, the objects of the present invention can be accomplished through any of the reaction with aldehydes followed by the reaction with alkylating agents; the reaction with alkylating agents followed by the reaction with aldehydes; and the simultaneous reaction with aldehydes and alkylating agents.

When formaldehyde and/or glyoxal as aldehydes and the alkylating agents are both employed, the amount of the former is not more than 1 mol, and preferably from 0.1 to 0.8 mol, per mol of component (c); and that of the latter is not more than 2 equivalents, and preferably from 0.1 to 1.5 equivalents, per equivalent of secondary amino groups of component (a). The reaction system preferably has a pH of from 5 to 8 in the case of using glyoxal, and of from 3 to 7 in the case of using formaldehyde. If necessary, the system after completion of the reaction is adjusted to a pH of from 4 to 8 with an alkali, e.g., sodium hydroxide, potassium hydroxide, etc., or an acid, e.g., hydrochloric acid, sulfuric acid, formic acid, etc.

The thus obtained resin is useful as component (3) of the paper coating composition according to the present invention.

The pigments which can be used as component (1) of the paper coating composition of the invention are selected from white inorganic pigments, such as kaolin, talc, calcium carbonate (either ground or precipitated), aluminum hydroxide, satin white, titanium dioxide, etc.; white organic synthetic pigments, such as polystyrene, melamine-formaldehyde resins, urea-formaldehyde resins, etc.; and mixtures of two or more thereof. In addition, inorganic or organic color pigments may also be used in combination.

The aqueous binders as component (2) include water-soluble binders, such as phosphate-esterified starch, oxidized starch, polyvinyl alcohol, casein, gelatin, carboxymethyl cellulose, etc.; aqueous emulsion type binders, such as styrene-butadine resins, vinyl acetate resins, ethylene-vinyl acetate resins, methyl methacrylate-butadiene resins, etc.; and mixtures of two or more thereof.

The paper coating composition according to the present invention comprises from 1 to 50 parts, and preferably from 6 to 40 parts, by weight of the aqueous binder (2) and from 0.05 to 10 parts, and preferably from 0.1 to 3 parts, by weight of the resin (3) per 100 parts by weight of the pigment (1), with the solids content ranging from 20% to 75% by weight based on the composition.

In the preparation of the paper coating composition, the resin (3) is usually added to the pigment and aqueous binder. The same results can be obtained if the resin is previously added to a pigment slurry and/or an aqueous binder.

The coating composition according to this invention can further contain, if desired, various additives, such as dispersing agents, viscocisty- and fluidity-controlling agents, defoaming agents, anti-septics, lubricants, water retaining agents, colorants including dyes and colored pigments, and the like.

The order of compounding the above-described components is not particularly limited. However, in compounding, it is desirable to appropriately select the order of compounding, the solids content of each component to be compounded, the pH level of the resulting composition so as to prevent reduction in dispersion stability of the composition due to differences in inoic characteristics.

The paper coating composition of the invention is applied on a paper base by any of commonly employed coating methods, such as blade coating, air knife coating, roll coating, side roll coating, gate roll coating, cast coating, and the like, followed by drying as required in a usual manner If desired, the coated paper is supercalendered.

The coated paper thus obtained by the use of the paper coating composition in accordance with the present invention possesses various excellent performances, such as high ink receptivity, high water resistance, improved surface gloss, improved opacity, improved anti-blister property, freedom from a formaldehyde odor, and the like.

The term "paper" in "paper coating composition" has been used in its broadest sense and includes paper and paperboard in the narrow sense.

This invention will now be illustrated in greater detail with reference to the following examples, but it should be understood that they are not intended to limit the present invention. In these examples, all the parts and percents are given by weight unless otherwise indicated.

EXAMPLE 1

In a four-necked flask equipped with a thermometer, a reflux condenser and a stirrer were charged 58.5 parts (0.4 mol) of triethylenetetramine and 12.0 parts (0.2 mol) of urea, and the mixture was heated at an inner temperature of 120° C. to 140° C. for 3 hours to effect deammoniation. Then, 34.4 parts (0.2 mol) of hexahydrophthalic acid was added thereto, and the mixture was heated at 150° C. to 160° C. for 5 hours to effect dehydrating amidation. After cooling to 130° C., 48.0 parts (0.8 mol) of urea was added to the reaction mixture, and the mixture was heated at 120° C. to 130° C. for 2 hours to perform deammoniation. After cooling to 100° C., water was added to make a 50% aqueous solution. To the reaction mixture was added 58 parts (0.4 mol) of 40% glyoxal, and the mixture was adjusted to a pH of 6 with 35% hydrochloric acid, followed by reacting at 50° C. for 3 hours. After completion of the reaction, the reaction mixture was cooled to 25° C. to obtain a resin solution $R_1$ having a concentration of 47% and a viscosity of 46 cp (at 25° C.; hereinafter the same).

EXAMPLE 2

In the same vessel as used in Example 1, 58.5 parts (0.4 mol) of triethylenetetramine and 12.0 parts (0.2 mol) of urea were charged and heated at an inner temperature of 120° C. to 140° C. for 3 hours to effect deammoniation. Thereafter, 33.2 parts (0.2 mol) of HN-2200 (a trade name of an alicyclic acid anhydride of formula:

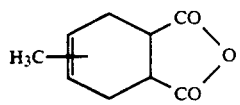

produced by Hitachi Chemical Co., Ltd.) was added to the reaction mixture, followed by heating at an inner temperature of 150° C. to 160° C. for 5 hours to effect dehydrating amidation. After lowering the inner temperature to 130° C., 12.0 parts (0.2 mol) of urea was charged, and the mixture was heated at 120° C. to 130° C. for 2 hours for deammoniation, followed by cooling to 100° C. Water was added to the reaction mixture to make a 50% aqueous solution.

To the aqueous solution was added 29 parts (0.2 mol) of 40% glyoxal, and the pH was adjusted to 6.5 with 70% sulfuric acid. The mixture was heated up to 60° C., at which temperature the reaction was continued for 4 hours. The reaction mixture was cooled to 25° C. to obtain a resin solution R2 having a concentration of 48.5% and a viscosity of 47 cp.

EXAMPLE 3

In the same vessel as used in Example 1, 58.5 parts (0.4 mol) of triethylenetetramine, 30.4 parts of tetrahydrophthalic anhydride and 12 parts (0.2 mol) of urea were charged simultaneously. The mixture was heated at 150° C. to 155° C. for 5 hours to simultaneously perform dehydrating amidation and deammoniation. After cooling to 130° C., 12 parts (0.2 mol) of urea was additionally charged, followed by heating at 125° C. to 130° C. for 2 hours to conduct deammoniation. The reaction mixture was diluted with water to make a 50% aqueous solution.

To the resulting solution was added 80 parts. (0.2 mol) of a 25% aqueous solution of glutaraldehyde. After adjusting to a pH of 6.5 with 70% sulfuric acid, the mixture was allowed to react at 55° C. for 7 days, followed by cooling to 25° C. to obtain a resin solution R3 having a concentration of 45% and a viscosity of 42 cp.

EXAMPLE 4

In the same vessel as in Example 1 was charged 29.2 parts (0.2 mol) of triethylenetetramine, and 30.8 parts (0.2 mol) of hexahydrophthalic anhydride was added thereto. The mixture was heated at 150° C. to 155° C. for dehydrating amidation. After the reaction mixture was cooled to 130° C., 12 parts (0.2 mol) of urea was added thereto, followed by heating at 125° C. to 130° C. for 2 hours to effect deammoniation. The reaction mixture was cooled to 60° C. and diluted with water to make a 50% aqueous solution.

Then, 14.5 parts (0.1 mol) of 40% glyoxal was added thereto, and the mixture was adjusted to a pH of 6 with 35% hydrochloric acid, followed by reacting at 65° C. for 2 hours. After cooling to 25° C., there was obtained a resin solution R4 having a concentration of 48.5% and a viscosity of 58 cp.

EXAMPLE 5

In the same vessel as in Example 1 were charged 12.4 parts (0.2 mol) of ethylene glycol and 60.8 parts (0.4 mol) of tetrahydrophthalic anhydride, and the mixture was heated at 140° C. for 2 hours to form a reaction product having a free carboxyl group. To the reaction mixture was added 12.0 parts (0.2 mol) of urea, and 58.5 parts (0.4 mol) of triethylenetetramine was added thereto while stirring at 110° C. to 120° C. The resulting mixture was subjected to deammoniation and dehydrating amidation by heating at 150° C. for 5 hours. After cooling to 130° C., an additional 12 parts (0.2 mol) of urea was added thereto, followed by allowing to react at 120° C. to 130° C. for 2 hours to effect deammoniation. The reaction mixture was cooled to 100° C., and water was added thereto to make a 50% aqueous solution.

Then, 1.45 parts (0.1 mol) of 40% glyoxal was charged therein, and the mixture was adjusted to a pH of 7 with 70% sulfuric acid, followed by reacting at 60° C. for 2 hours. The reaction mixture was cooled to 25° C. to obtain a resin solution R5 having a concentration of 49% and a viscosity of 49 cp.

EXAMPLE 6

In the same vessel as in Example 1, 58.5 parts (0.4 mol) of triethylenetetramine and 12.0 parts (0.2 mol) of urea were charged, followed by heating at an inner temperature of 120° C. to 140° C. for 3 hours to effect deammoniation. Thereafter, 30.4 parts (0.2 mol) of tetrahydrophthalic anhydride was added thereto, and the mixture was heated at an inner temperature of 150° C. to 160° C. for 5 hours to effect dehydrating amidation. After cooling to an inner temperature of 18° C., 48 parts (0.8 mol) of urea was added, and the mixture was subjected to deammoniation at 120° C. to 130° C. for 2 hours. After cooling to 100° C., water was added to the reaction mixture to make a 50% aqueous solution.

Then, 29 parts (0.2 mol) of 40% glyoxal was added to the solution, and the mixture was adjusted to a pH of 6 with 70% sulfuric acid, followed by reacting at 60° C. for 3 hours. To the reaction mixture was added 16.2 parts (0.2 mol) of 37% formalin, and the mixture was adjusted to a pH of 5 with 70% sulfuric acid, followed by again reacting at 60° C. for 3 hours. After completion of the reaction, the reaction mixture was cooled to 25° C. and adjusted to a pH of 6 with a 28% sodium hydroxide aqueous solution to obtain a resin solution R6 having a concentration of 48% and a viscosity of 56 cp.

EXAMPLE 7

In the same vessel as used in Example 1, 58.5 parts (0.4 mol) of triethylenetetramine and 12 parts (0.2 mol) of urea were charged, and the mixture was heated at 145° C. to 150° C. for 4 hours to effect deammoniation. Separately, 60.8 parts (0.4 mol) of tetrahydrophthalic anhydride and 15.2 parts (0.2 mol) of propylene glycol were mixed and heated at 140° C. to 150° C. for 2 hours to prepare a polyester. The whole quantity of the resulting polyester was transferred to the above reaction vessel after completion of deammoniation, and the mixture was heated at an inner temperature of 150° C. to 155° C. for 4 hours to effect dehydration and deammoniation. After cooling to 130° C., 12 parts (0.2 mol) of urea was added thereto, followed by deammoniation at 125° C. to 130° C. for 2 hours. Water was added to the reaction mixture to make a 50% aqueous solution, and to the solution were added 40 parts of a 25% aqueous solution of glutaraldehyde and 4 parts (0.05 mol) of 37% formalin. After adjusting to a pH of 5.5 with 70% sulfuric acid, the mixture was heated to 70° C., at which temperature the mixture was allowed to react for 4 hours, followed by cooling to 25° C. The resulting reaction mixture was adjusted to a pH of 6.5 with a 28% sodium hydroxide aqueous solution to obtain a resin solution R7 having a concentration of 47.5% and a viscosity of 46 cp.

COMPARATIVE EXAMPLE 1

A resin solution R8 having a concentration of 47% and a viscosity of 44 cp was prepared in the same manner as described in Example 1, except for replacing the hexahydrophthalic acid with 29.6 parts (0.2 mol of phthalic anhydride.

COMPARATIVE EXAMPLE 2

A resin solution R9 having a concentration of 47% and a viscosity of 51 cp was prepared in the same manner as in Example 1, except for replacing the hexahydrophthalic acid with 29.2 parts (0.2 mol) of adipic acid.

COMPARATIVE EXAMPLE 3

A resin solution R10 having a concentration of 49% and a viscosity of 46 cp was prepared in the same manner as described in Example 5, except that the carboxyl-terminated reaction product as prepared in Example 5 was replaced with a carboxyl-terminated polyester obtained by reacting 58.5 parts (0.4 mol) of adipic acid and 12.4 parts (0.2 mol) of ethylene glycol at 160° C. to 180° C. for 3 hours and that the reaction with 40% glyoxal was continued for 3 hours.

EXAMPLE 8

In a four-necked flask equipped with a thermometer, a reflux condenser and a stirrer were charged 58.5 parts (0.4 mol) of triethylenetetramine and 12.0 parts (0.2 mol) of urea, and the mixture was heated at an inner temperature of 120° C. to 140° C. for 3 hours to effect deammoniation. Then, 34.4 parts (0.2 mol) of hexahydrophthalic acid was charged therein, and the mixture was heated at an inner temperature of 150° C. to 160° C. for 5 hours to effect dehydrating amidation. After cooling to an inner temperature of 130° C., 48.0 parts (0.8 mol) of urea was added to the reaction mixture, followed by allowing the mixture to react at a temperature of from 120° C. to 130° C. for 2 hours to effect deammoniation. The reaction mixture was cooled to 100° C., and water was added thereto to make a 50% aqueous solution. Then, 32.4 parts (0.4 mol) of 37% formalin was added to the solution. After adjusting to a pH of 5.1 with 70% sulfuric acid, the mixture was allowed to react at 60° C. for 5 hours. After cooling to 25° C., the reaction mixture was neutralized to a pH of 7.1 with a 28% sodium hydroxide aqueous solution to obtain a resin solution $R_{11}$ having a concentration of 48.5% and a viscosity of 45 cp.

EXAMPLE 9

In the same vessel as used in Example 8 were charged 58.5 parts (0.4 mol) of triethylenetetramine and 12.0 parts (0.2 mol) of urea, and the mixture was reacted at an inner temperature of 120° C. to 140° C. for 3 hours to effect deammoniation. Thereafter, 30.4 parts (0.2 mol) of tetrahydrophthalic anhydride was charged therein, followed by heating at an inner temperature of 150° C. to 160° C. for 5 hours to effect dehydrating amidation. After cooling to 130° C., 48 parts (0.8 mol) of urea was added to the reaction mixture, and the mixture was allowed to react at 120° C. to 130° C. for 2 hours to effect deammoniation. The reaction mixture was cooled to 100° C., and water was added thereto to make a 50% aqueous solution. To the solution was added 32.4 parts (0.4 mol) of 37% formalin, and the system was adjusted to a pH of 5.0 with 70% sulfuric acid. The resulting mixture was allowed to react at 60° C. for 4 hours, followed by cooling to 25° C. Neutralization with a 28% sodium hydroxide aqueous solution gave a resin solution R12 having a pH of 7.34, a concentration of 49.0% and a viscosity of 52.1 cp.

EXAMPLE 10

In the same vessel as used in Example 8, 75.7 parts (0.4 mol) of tetraethylenepentamine and 12.0 parts (0.2 mol) of urea were charged and heated at an inner temperature of 120° C. to 140° C. for 3 hours to effect deammoniation. Then, 30.4 parts (0.2 mol) of tetrahydrophthalic anhydride was charged therein, and the mixture was heated at 150° C. to 160° C. for 5 hours to effect dehydrating amidation. After cooling to an inner temperature of 130° C., 24.0 parts (0.4 mol) of urea was added, followed by deammoniation at 120° C. to 130° C. for 2 hours. After cooling to 100° C., water was added to the reaction mixture to make a 50% aqueous solution. To the solution was added 16.2 parts (0.2 mol) of 37% formalin followed by adjusting to a pH of 5.15 with 70% sulfuric acid. The mixture was allowed to react at 60° C. for 4 hours, cooled, and neutralized with a 28% sodium hydroxide aqueous solution to obtain a resin solution R13 having a pH of 7.23, a concentration of 49.5% and a viscosity of 79.5 cp.

EXAMPLE 11

In the same vessel as used in Example 8 were charged 58.5 parts (0.4 mol) of triethylenetetramine and 12.0 parts (0.2 mol) of urea, and the mixture was heated at an inner temperature of 120° C. to 140° C. for 3 hours to effect deammoniation. Thereafter, 33.2 parts (0.2 mol) of HN-2200 (the same as used in Example 2) was added thereto, followed by heating at an inner temperature of 150° C. to 160° C. for 5 hours to effect dehydrating amidation. After cooling to an inner temperature of 130° C., 12.0 parts (0.2 mol) of urea was added thereto, followed by allowing the mixture to react at 120° C. to 130° C. for 2 hours to effect deammoniation. The reaction mixture was cooled to 100° C., and water was added thereto to make a 50% aqueous solution. To the solution was added 8.1 parts (0.1 mol) of 37% formalin, and the system was adjusted to a pH of 5.0 with 70% sulfuric acid. The mixture was heated 6 to 0° C., at which temperature the system was allowed to react for 4 hours. The reaction mixture was cooled to 25° C. and then neutralized with a 28% sodium hydroxide aqueous solution to obtain a resin solution R14 having a pH of 7.06, a concentration of 50.1% and a viscosity of 52.0 cp.

EXAMPLE 12

In the same vessel as used in Example 8 were charged 12.4 parts (0.2 mol) of ethylene glycol and 60.8 parts (0.4 mol) of tetrahydrophthalic anhydride, and the mixture was heated at 140° C. for 2 hours to obtain a reaction product having a free carboxyl group. To the reaction mixture was added 12.0 parts (0.2 mol) of urea, and 58.5 parts (0.4 mol) of triethylenetetramine was further added thereto at 110° C. to 120° C. while stirring. The mixture was subjected to deammoniation and dehydrating amidation by heating at 150° C. for 5 hours. After cooling to 130° C., 12.0 parts (0.2 mol) of urea was further added thereto, followed by deammoniation at 120° C. to 130° C. for 2 hours. After cooling to 100° C., water was added to the reaction mixture to make a 50% aqueous solution. Then, 8.1 parts (0.1 mol) of 37% formalin was added thereto, and the system was adjusted to a pH of 5.0 with 70% sulfuric acid. The mixture was allowed to react at 60° C. for 4 hours, and the resulting reaction mixture was cooled and neutralized with a 28% sodium hydroxide aqueous solution to obtain a resin solution R15 having a pH of 7.23, a concentration of 50.2% and a viscosity of 43 cp.

EXAMPLE 13

In the same vessel as used in Example 8 were charged 29.2 parts (0.2 mol) of triethylenetetramine, and 30.8 parts (0.2 mol) of hexahydrophthalic anhydride was added thereto, followed by heating to 150° C. to 155° C., at which temperature dehydrating amidation was effected. After the reaction mixture was cooled to 130° C., 12 parts (0.2 mol) of urea was added thereto, and deammoniation was carried out at 125° C. to 130° C. for 2 hours. After cooling to 60° C., water was added to the reaction mixture to make a 50% aqueous solution. To the solution was added 8.1 parts (0.1 mol) of 37% formalin, and the mixture was adjusted to a pH of 5.0 with 70% sulfuric acid, followed by allowing to react at 60° C. to 65° C. for 4 hours.

After completion of the reaction, the reaction mixture was neutralized with a 28% sodium hydroxide aqueous solution to obtain a resin solution R16 having a pH of 7.2, a concentration of 47.9% and a viscosity of 36 cp.

EXAMPLE 14

In the same vessel as used in Example 8 were charged simultaneously 58.5 parts (0.4 mol) of triethylenetetramine, 30.4 parts (0.2 mol) of tetrahydrophthalic anhydride and 12 parts (0.2 mol) of urea, and the mixture was heated at 150° C. to 155° C. for 5 hours to effect dehydrating amidation and deammoniation simultaneously. After cooling to 130° C., 12 parts (0.2 mol) of urea was additionally charged, and the mixture was reacted at 125° C. to 130° C. for 2 hours for deammoniation. Water was added to the reaction mixture to make a 50% aqueous solution. To the solution was added 8.1 parts (0.1 mol) of 37% formalin. After adjusting to a pH of 5.0 with 70% sulfuric acid, the mixture was allowed to react at 60° C. to 65° C. for 4 hours, followed by cooling to 25° C. The reaction mixture was neutralized with a 28% sodium hydroxide aqueous solution to obtain a resin solution R17 having a pH of 7.42, a concentration of 50.4% and a viscosity of 32 cp.

EXAMPLE 15

In the same vessel as used in Example 8, 58.5 parts (0.4 mol) of triethylenetetramine and 12 parts (0.2 mol) of urea were charged, and the mixture was heated at 145° C. to 150° C. for 4 hours to effect deammoniation. Separately, 60.8 parts (0.4 mol) of tetrahydrophthalic anhydride and 15.2 parts (0.2 mol) of propylene glycol were mixed and heated at 140° C. to 150° C. for 2 hours to prepare a polyester. The whole quantity of the resulting polyester was transferred to the above reaction vessel after completion of deammoniation, and the mixture was heated at an inner temperature of 150° C. to 155° C. for 4 hours to effect dehydration and deammoniation. After cooling to 130° C., 12 parts (0.2 mol) of urea was added thereto, followed by deammoniation at 125° C. to 130° C. for 2 hours. Water was added to the reaction mixture to make a 50% aqueous solution. To the solution was added 8.1 parts (0.1 mol) of 37% formalin, and the system was adjusted to a pH of 5.1 with 70% sulfuric acid. The mixture was allowed to react at 60° C. to 65° C. for 4 hours. After cooling to 25° C., the reaction mixture was neutralized with a 28% sodium hydroxide aqueous solution to obtain a resin solution R18 having a pH of 7.51, a concentration of 49.8% and a viscosity of 47 cp.

COMPARATIVE EXAMPLE 4

A resin solution R19 having a pH of 7.2, a concentration of 48.7% and a viscosity of 44 cp was prepared in the same manner as in Example 8, except for replacing the hexahydrophthalic acid as used in Example 8 with 29.6 parts (0.2 mol) of phthalic anhydride.

COMPARATIVE EXAMPLE 5

A resin solution R20 having a pH of 7.01, a concentration of 50.3% and a viscosity of 66 cp was prepared in the same manner as in Example 8, except for replacing the hexahydrophthalic acid as used in Example 8 with 29.2 parts (0.2 mol) of adipic acid.

COMPARATIVE EXAMPLE 6

A resin solution R21 having a pH of 7.25, a concentration of 50.6% and a viscosity of 96 cp was prepared in the same manner as described in Example 12, except that the carboxyl-terminated polyester was obtained by heating 58.5 parts (0.4 mol) of adipic acid and 12.4 parts (0.2 mol) of ethylene glycol at 160° C. to 180° C. for 3 hours and that the system after addition of 37% formalin was adjusted to a pH of 4.8.

EXAMPLE 16

In a four-necked flask equipped with a thermometer, a reflux condenser and a stirrer were charged 58.5 parts (0.4 mol) of triethylenetetramine and 12.0 parts (0.2 mol) of urea, and the mixture was heated at an inner temperature of 120° C. to 140° C. for 3 hours to effect deammoniation. Then, 34.4 parts (0.2 mol) of hexahydrophthalic acid was added thereto, followed by heating at an inner temperature of 150° C. to 160° C. for 5 hours to effect dehydrating amidation. After cooling to an inner temperature of 130° C., 48.0 parts (0.8 mol) of urea was charged therein, and the mixture was allowed to react at 120° C. to 130° C. for 2 hours to effect deammoniation. The reaction mixture was cooled to 100° C. and diluted with water to make a 50% aqueous solution. To the solution was added 18.5 parts (0.2 mol) epichlorohydrin, and the mixture was allowed to react at 60° C. for 4 hours, followed by cooling to 25° C. The reaction mixture was adjusted to a pH of 7 with 35% hydrochloric acid, and water was added thereto to obtain a resin solution R22 having a concentration of 50% and a viscosity of 52 cp.

EXAMPLE 17

In the same vessel as used in Example 16 was charged 29.2 parts (0.2 mol) of triethylenetetramine, and 30.8 parts (0.2 mol) of hexahydrophthalic anhydride was added thereto. The mixture was heated at 150° C. to 155° C. to effect dehydrating amidation, followed by cooling to 130° C. To the mixture was added 12 parts (0.2 mol) of urea, followed by allowing to react at 125° C. to 130° C. for 2 hours to effect deammoniation. After cooling to 60° C., the reaction mixture was diluted with water to make a 50% aqueous solution To the resulting solution were added 18.5 parts (0.2 mol) of epichlorohydrin and 15.4 parts (0.1 mol) of diethyl sulfate, and the mixture was allowed to react at 60° C. for 7 hours, followed by cooling to 25° C. The reaction mixture was adjusted to a pH of 6 with 20% sulfuric acid, and water was then added thereto to obtain a resin solution R23 having a concentration of 50% and a viscosity of 63 cp.

EXAMPLE 18

In the same vessel as used in Example 16, 58.5 parts (0.4 mol) of triethylenetetramine, 30.4 parts (0.2 mol) of tetrahydrophthalic anhydride and 12 parts (0.2 mol) of urea were charged simultaneously. The resulting mixture was heated at 150° C. to 155° C. for 5 hours to effect dehydrating amidation and deammoniation at the same time. After cooling to 130° C., 12 parts (0.2 mol) of urea was added thereto, followed by allowing to react at 125° C. to 130° C. for 2 hours to effect deammoniation. Water was added to the reaction mixture to make a 50% aqueous solution. To the solution was added 23.2 parts (0.4 mol) of propylene oxide, and the mixture was allowed to react at 25° C. for 6 hours. Then, 9.3 parts (0.1 mol) of epichlorohydrin was added thereto, followed by heating at 60° C. for 3 hours. After cooling to 30° C., the reaction mixture was adjusted to a pH of 6 with 35% hydrochloric acid, and water was added thereto to prepare a resin solution R24 having a concentration of 50% and a viscosity of 55 cp.

EXAMPLE 19

In the same vessel as used in Example 16 were charged 58.5 parts (0.4 mol) of triethylenetetramine and 12 parts (0.2 mol) of urea, and the mixture was reacted at 145° C. to 150° C. for 4 hours to effect deammoniation. Separately, 60.8 parts (0.4 mol) of tetrahydrophthalic anhydride and 15.2 parts (0.2 mol) of propylene glycol were mixed and heated at 140° C. to 150° C. for 2 hours to prepare a polyester. The whole quantity of the resulting polyester was added to the above reaction vessel containing the deammoniation reaction mixture, and the resulting mixture was heated at an inner temperature of 150° C. to 155° C. for 4 hours to effect dehydration and deammoniaton. After cooling to 130° C., 12 parts (0.2 mol) of urea was added to the reaction mixture, followed by allowing to react at 125° C. to 130° C. for 2 hours to effect deammoniation. Water was added to the reaction mixture to make a 50% aqueous solution. To the solution was added 18.5 parts (0.2 mol) of epichlorohydrin, followed by allowing the mixture to react at 65° C. for 2 hours. Then, 8.1 parts (0.1 mol) of 37% formalin was added thereto. After adjusting the system to a pH of 5 with 70% sulfuric acid, the mixture was allowed to react at 65° C. for 4 hours, followed by cooling to 25° C. The reaction mixture was adjusted to a pH of 7 with a 28% sodium hydroxide aqueous solution to obtain a resin solution R25 having a concentration of 50% and a viscosity of 48 cp.

EXAMPLE 20

In the same vessel as used in Example 16 were charged 12.4 parts (0.2 mol) of ethylene glycol and 60.8 parts (0.4 mol) of tetrahydrophthalic anhydride, followed by heating at 140° C. for 2 hours to obtain a reaction product having a free carboxyl group. To the reaction mixture was added 12.0 parts (0.2 mol) of urea, and 58.5 parts (0.4 mol) of triethylenetetramine was further added thereto at 110° C. to 120° C. while stirring. The mixture was then heated at 150° C. for 5 hours to effect deammoniation and dehydrating amidation. After cooling to 130° C., 12.0 parts (0.2 mol) of urea was added to the reaction mixture, followed by allowing the mixture to react at 120° C. to 130° C. for 2 hours to effect deammoniation. The reaction mixture was cooled to 100° C., and water was added thereto to make a 50% aqueous solution. Then, 77 parts (0.5 mol) of diethyl sulfate was charged therein, and the mixture was reacted at 60° C. for 4 hours, followed by cooling to 25° C. The system was adjusted to a pH of 7 with 20% sulfuric acid, and water was added thereto to obtain a resin solution R26 having a concentration of 50% and a viscosity of 43 cp.

EXAMPLE 21

The same procedure as described in Example 19 was repeated except that 14.5 parts (0.1 mol) of 40% glyoxal was used in place of the 37% formalin as used in Example 19 and, after adjusting to a pH of 6 with 70% sulfuric acid, the resulting mixture was reacted at 55° C. for 4 hours. There was obtained a resin solution R27 having a concentration of 50% and a viscosity of 51 cp.

COMPARATIVE EXAMPLE 7

A resin solution R28 having a concentration of 50% and a viscosity of 49 cp was prepared in the same manner as described in Example 16, except for using 29.6 parts (0.2 mol) of phthalic anhydride in place of the hexahydrophthalic acid as used in Example 16.

COMPARATIVE EXAMPLE 8

A resin solution R29 having a concentration of 50% and a viscosity of 58 cp was prepared in the same manner as described in Example 16, except for using 29.2 parts (0.2 mol) of adipic acid in place of the hexahydrophthalic acid as used in Example 16.

COMPARATIVE EXAMPLE 9

A resin solution R30 having a concentration of 50% and a viscosity of 57 cp was prepared in the same manner as in Example 20, except that the carboxylterminated polyester was obtained by heating 58.5 parts (0.4 mol) of adipic acid and 12.4 parts (0.2 mol) of ethylene glycol at 160° C. to 180° C. for 3 hours.

EXAMPLES 22 TO 28 AND COMPARATIVE EXAMPLES 10 TO 13

A paper coating composition was prepared by using each of the resin solutions R1 to R10 as obtained in Examples 1 to 7 and Comparative Examples 1 to 3 and Sumirez® resin 613 (a trade name for a water-soluble melamine-formaldehyde resin produced by Sumitomo Chemical Co., Ltd.) according to the formulation as shown in Table 1 below:

TABLE 1

| | | Compounding Ratio (part)*6 |
|---|---|---|
| Pigment | Ultrawhite ® 90*1 | 75 |
| | Carbital ® 90*2 | 25 |
| Dispersing Agent | Sumirez ® resin DS-10*3 | 0.2 |
| Aqueous Binder | SN-307*4 | 12 |
| | Oji Ace ® A*5 | 6 |
| Resin | see Table 2 | 0.3 |

Note:
*1 Clay manufactured by Engel Hard Minerals Inc., U.S.A.
*2 Calcium carbonate manufactured by Fuji Kaolin Co., Ltd.
*3 Polyacrylic acid type pigment dispersant produced by Sumitomo Chemical Co., Ltd.
*4 Styrene-butadiene latex produced by Sumitommo Naugatuc Co., Ltd.
*5 Oxidized starch produced by Oji International Starch Co., Ltd.
*6 On a solids content basis Each of the thus prepared compositions was adjusted so as to have a total solids content of 60% and a pH of about 8.5 by addition of water and a 10% sodium hydroxide aqueous solution. The coating compositions was coated with a wire rod on one side of fine paper having a basis weight of 80 g/m² at a spread of about 14 g/m², immediately followed by during in hot air at 120° C. for 30 seconds. After moisture-conditioning at 20° C. and 65% RH (relative humidity) for 16 hours, the coated paper was subjected to supercalendering twice under conditions of 60° C. in temperature and 60 kg/cm in linear pressure.

Each of the resulting coated papers was evaluated for water resistance, ink receptivity and evolution of formaldehyde in accordance with the following test methods. The results obtained are shown in Table 2.

Water Resistance
(a) Wet Rub Method (WR)
    About 0.1 ml of ion-exchange water was dropped on the coated surface, and 7 rubs with a finger tip were given. The matter rubbed off was transferred to black paper, and its amount was visually determined to evaluate water resistance based on five ratings of from 1 (poor) to 5 (excellent).
(b) Wet Pick Method (WP)
    The coated surface was wetted with a watersupply roll by means of an RI tester (manufactured by Akira Seisakusho Co., Ltd.), and printed. The picking was visually observed to evaluate water resistance based on five ratings of from 1 (poor) to 5 (excellent).

Ink Receptivity
Method A
    The coated surface was wetted with a watersupply roll by means of an RI tester, and printed. Ink receptivity was evaluated based on five ratings of from 1 (poor) to 5 (excellent).
Method B
    Printing was carried out while incorporating water in an ink by the use of an RI tester. Evaluation of ink receptivity was made based on the same ratings as adopted in Method A.

Evolution of Formaldehyde
A sample weighting 25 g was quantitatively analyzed for formaldehyde in accordance with JIS-L1041-1976 "Liquid Phase Extraction Method (2), Acetylacetone Method (Method A)".

EXAMPLES 29 TO 36 AND COMPARATIVE EXAMPLES 14 TO 17

Paper coating compositions were prepared in the same manner as in Examples 22 to 28 and Comparative Examples 10 to 13, except for using resin solutions R11 to R21 in place of R1 to R10. The test results obtained are shown in Table 3.

EXAMPLE 37 TO 42 AND COMPARATIVE EXAMPLES 18 TO 21

Paper coating compositions were prepared in the same manner as in Examples 22 to 28 and Comparative Examples 10 to 13, except for using resin solutions R22 to R30 in place of R1 to R10. The test results obtained are shown in Table 4.

TABLE 2

|  | Ex. 22 | Ex. 23 | Ex. 24 | Ex. 25 | Ex. 26 | Ex. 27 | Ex. 28 | Com. Ex. 10 | Com. Ex. 11 | Com. Ex. 12 | Com. Ex. 13 | Blank |
|---|---|---|---|---|---|---|---|---|---|---|---|---|
| Coating Composition | | | | | | | | | | | | |
| Resin Used | R1 | R2 | R3 | R4 | R5 | R6 | R7 | R8 | R9 | R10 | 613** | none |
| pH (at 25° C.) | 8.4 | 8.4 | 8.5 | 8.4 | 8.5 | 8.4 | 8.5 | 8.6 | 8.5 | 8.6 | 8.5 | 8.5 |
| Viscosity (at 25° C.) (cp) | 1150 | 1140 | 1160 | 1130 | 1140 | 1130 | 1110 | 1170 | 1310 | 1420 | 1180 | 1150 |
| Coated Paper | | | | | | | | | | | | |
| Water Resistance: | | | | | | | | | | | | |
| WR Method | 4.8 | 4.8 | 4.8 | 4.8 | 4.8 | 4.8 | 4.8 | 3.0 | 2.5 | 2.5 | 2.5 | 1.0 |
| WP Method | 4.6 | 4.5 | 4.6 | 4.8 | 4.6 | 4.7 | 4.5 | 2.5 | 2.4 | 2.2 | 2.0 | 1.0 |
| Ink Receptivity: | | | | | | | | | | | | |
| Method A | 4.8 | 4.6 | 4.6 | 4.7 | 4.8 | 4.7 | 4.7 | 2.8 | 2.5 | 2.8 | 1.5 | 1.0 |
| Method B | 4.7 | 4.8 | 4.7 | 4.7 | 4.6 | 4.6 | 4.6 | 3.0 | 2.4 | 2.5 | 1.5 | 1.0 |
| Amount of Evolved Formaldehyde (ppm) | 0 | 0 | 0 | 0 | 0 | 2 | 1 | 0 | 0 | 0 | 34 | 1 |
| Spread (g/m$^2$) | 14.6 | 14.5 | 14.5 | 14.6 | 14.8 | 14.5 | 14.7 | 14.6 | 14.8 | 14.5 | 14.5 | 14.5 |

Note:
*Determined by the use of a Brookfield viscometer at 60 rpm (hereinafter the same)
**Sumirez ® resin 613 (hereinafter the same).

TABLE 3

|  | Ex. 29 | Ex. 30 | Ex. 31 | Ex. 32 | Ex. 33 | Ex. 34 | Ex. 35 | Ex. 36 | Com. Ex. 14 | Com. Ex. 15 | Com. Ex. 16 | Com. Ex. 17 | Blank |
|---|---|---|---|---|---|---|---|---|---|---|---|---|---|
| Coating Composition | | | | | | | | | | | | | |
| Resin Used | R11 | R12 | R13 | R14 | R15 | R16 | R17 | R18 | R19 | R20 | R21 | 613** | none |
| pH (at 25° C.) | 8.4 | 8.4 | 8.5 | 8.4 | 8.5 | 8.4 | 8.5 | 8.5 | 8.6 | 8.5 | 8.6 | 8.5 | 8.5 |
| Viscosity (at 25° C.) (cp) | 1160 | 1148 | 1150 | 1128 | 1142 | 1120 | 1130 | 1190 | 1180 | 1330 | 1470 | 1180 | 1148 |
| Coated Paper | | | | | | | | | | | | | |
| Water Resistance: | | | | | | | | | | | | | |
| WR Method | 4.8 | 4.8 | 4.8 | 4.8 | 4.8 | 4.8 | 4.8 | 4.8 | 3.0 | 2.5 | 2.5 | 2.5 | 1.0 |
| WP Method | 4.4 | 4.5 | 4.4 | 4.8 | 4.8 | 4.7 | 4.7 | 4.8 | 2.5 | 2.2 | 2.6 | 2.0 | 1.0 |
| Ink Receptivity: | | | | | | | | | | | | | |
| Method A | 4.8 | 4.5 | 4.6 | 4.8 | 4.8 | 4.8 | 4.7 | 4.8 | 3.0 | 2.5 | 2.8 | 1.5 | 1.0 |
| Method B | 4.6 | 4.8 | 4.6 | 4.7 | 4.5 | 4.6 | 4.7 | 4.6 | 3.0 | 2.5 | 2.5 | 1.5 | 1.0 |
| Amount of Evolved Formaldehyde (ppm) | 3 | 2 | 2 | 2 | 2 | 2 | 2 | 2 | 3 | 3 | 3 | 32 | 1 |
| Spread (g/m$^2$) | 14.3 | 14.6 | 14.5 | 14.5 | 14.3 | 14.4 | 14.7 | 14.2 | 14.2 | 14.8 | 14.5 | 14.6 | 14.2 |

TABLE 4

|  | Ex. 37 | Ex. 38 | Ex. 39 | Ex. 40 | Ex. 41 | Ex. 42 | Ex. 18 | Com. Ex. 19 | Com. Ex. 20 | Com. Ex. 21 | Blank |
|---|---|---|---|---|---|---|---|---|---|---|---|
| Coating Composition | | | | | | | | | | | |
| Resin Used | R22 | R23 | R24 | R25 | R26 | R27 | R28 | R29 | R30 | 613** | none |
| pH (at 25° C.) | 8.4 | 8.4 | 8.5 | 8.4 | 8.5 | 8.4 | 8.6 | 8.5 | 8.6 | 8.5 | 8.5 |
| Viscosity (at 25° C.)* (cp) | 1145 | 1150 | 1130 | 1140 | 1110 | 1150 | 1150 | 1310 | 1360 | 1170 | 1130 |
| Coated Paper | | | | | | | | | | | |
| Water Resistance: | | | | | | | | | | | |
| WR Method | 4.8 | 4.8 | 4.8 | 4.8 | 4.8 | 4.8 | 3.0 | 2.5 | 2.5 | 2.5 | 1.0 |
| WP Method | 4.5 | 4.5 | 4.7 | 4.6 | 4.8 | 4.7 | 2.4 | 2.4 | 2.5 | 2.0 | 1.0 |
| Ink Receptivity: | | | | | | | | | | | |
| Method A | 4.8 | 4.6 | 4.5 | 4.8 | 4.7 | 4.8 | 3.0 | 2.6 | 2.6 | 1.5 | 1.0 |
| Method B | 4.7 | 4.8 | 4.6 | 4.6 | 4.5 | 4.6 | 2.8 | 2.5 | 2.5 | 1.5 | 1.0 |
| Amount of Evolved Formaldehyde (ppm) | 0 | 0 | 0 | 1 | 0 | 0 | 0 | 0 | 35 | 1 | |
| Spread (g/m$^2$) | 14.8 | 14.6 | 14.5 | 14.5 | 14.3 | 14.4 | 14.8 | 14.6 | 14.5 | 14.5 | 14.3 |

While the invention has been described in detail and with reference to specific embodiments thereof, it will be apparent to one skilled in the art that various changes and modifications can be made therein without departing from the spirit and scope thereof.

What is claimed is:

1. A process for preparing a coated paper which comprises coating a paper with a water soluble resin which is obtained by reacting (a) a polyalkylenepolyamine, (b) an alicyclic dibasic carboxylic acid and/or a reaction product having a free carboxyl group that is obtained by reacting an alicyclic dibasic carboxylic acid with a glycol having two carboxyl groups directly attached to the alicyclic ring, wherein the carboxyl groups in the alicyclic dibasic carboxylic acid are connected directly with the alicyclic ring, (c) a urea, and (d) an aldehyde and/or an alkylating agent selected from compounds represented by the formula:

$$R_1-X$$

wherein $R_1$ represents a lower alkyl group, an alkenyl group, a benzyl group or a phenoxyethyl group; and X represents a halogen atom; compounds represented by the formula:

$$(R_2O)_2SO_v$$

wherein $R_2$ represents a lower alkyl group; and v represents 1 or 2; compounds represented by formula:

$$R_3-CH\underset{O}{\overset{}{\diagdown\diagup}}CH_2$$

wherein $R_3$ represents a hydrogen atom, a lower alkyl group, a hydroxyalkyl group or a phenyl group; compounds represented by formula:

$$CH_2\underset{O}{\overset{}{\diagdown\diagup}}CH(CH_2)_wX$$

wherein X represents a halogen atom; and w represents 1, 2 or 3, compounds represented by formula:

$$HOCH_2(CH_2)_wX$$

wherein X and w are as defined above, compounds represented by formula:

$$\begin{array}{l}CH_2-X\\|\\CH-Y\\|\\CH_2-Z\end{array}$$

wherein X is as defined above; and either one of Y and Z represents a halogen atom, with the other representing a hydroxyl group, and mixtures thereof.

2. A process as in claim 1, wherein said paper is further coated with:
  (1) a pigment, and
  (2) an aqueous binder.

3. A process as in claim 2, wherein said aqueous binder is coated in an amount of 1 to 50 parts by weight and said resin is coated in an amount of 0.05 to 10 parts by weight per 100 parts by weight of the pigment.

4. A process as in claim 3, wherein said aqueous binder is coated in an amount of 6 to 40 parts by weight and said resin is coated in an amount of 0.01 to 3 parts by weight per 100 parts by weight of the pigment.

5. A process as in claim 1, wherein said dibasic carboxylic acid is in the form of an ester or anhydride thereof.

* * * * *